(12) United States Patent
Song

(10) Patent No.: US 8,553,161 B2
(45) Date of Patent: Oct. 8, 2013

(54) COLOR FILTER ARRAY SUBSTRATE, LIQUID CRYSTAL DISPLAY DEVICE COMPRISING THE SAME, AND METHOD FOR MANUFACTURING THE SAME

(75) Inventor: In Hyuk Song, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 312 days.

(21) Appl. No.: 13/073,614

(22) Filed: Mar. 28, 2011

(65) Prior Publication Data
US 2011/0242444 A1    Oct. 6, 2011

(30) Foreign Application Priority Data

Mar. 30, 2010    (KR) .................. 10-2010-0028349

(51) Int. Cl.
*G02F 1/1335*    (2006.01)

(52) U.S. Cl.
USPC ............................. 349/12; 349/106; 349/108

(58) Field of Classification Search
USPC .......................................... 349/12, 106–109
See application file for complete search history.

(56) References Cited

U.S. PATENT DOCUMENTS

| 7,924,350 | B2 * | 4/2011 | Ma et al. ........................ 349/12 |
| 8,052,498 | B2 * | 11/2011 | Chien et al. .................... 445/24 |
| 8,142,250 | B2 * | 3/2012 | Chien et al. .................... 445/24 |
| 2007/0195029 | A1 | 8/2007 | Jeon et al. |
| 2008/0180400 | A1 | 7/2008 | Kim et al. |
| 2009/0096760 | A1 * | 4/2009 | Ma et al. ........................ 345/174 |
| 2009/0179868 | A1 | 7/2009 | Ayres et al. |
| 2009/0322702 | A1 * | 12/2009 | Chien et al. .................... 345/174 |
| 2010/0136868 | A1 * | 6/2010 | Chien et al. .................... 445/24 |
| 2010/0149117 | A1 * | 6/2010 | Chien et al. .................... 345/173 |
| 2010/0171718 | A1 * | 7/2010 | Denda ........................... 345/173 |
| 2010/0316851 | A1 * | 12/2010 | Hirai et al. .................... 428/195.1 |
| 2010/0321327 | A1 * | 12/2010 | Liu ................................ 345/174 |
| 2011/0134055 | A1 * | 6/2011 | Jung et al. ..................... 345/173 |
| 2011/0242444 | A1 * | 10/2011 | Song .............................. 349/43 |
| 2012/0015464 | A1 * | 1/2012 | Chien et al. .................... 438/29 |

FOREIGN PATENT DOCUMENTS

| CN | 101231563 A | 7/2008 |
| CN | 101470290 A | 7/2009 |
| CN | 101963713 A | 2/2011 |
| KR | 10-2007-0082959 A | 8/2007 |

* cited by examiner

*Primary Examiner* — Rhonda Peace
(74) *Attorney, Agent, or Firm* — Birch, Stewart, Kolasch & Birch, LLP

(57) ABSTRACT

Discussed are a color filter array substrate with sensing lines capable of sensing a user's touch, and a method for manufacturing the color filter array substrate, wherein the color filter array substrate comprises a plurality of first sensing electrodes at fixed intervals on a substrate; a plurality of second sensing electrodes respectively interposed between each of the first sensing electrodes, wherein each second sensing electrode is provided at a predetermined interval from each first sensing electrode; and a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between.

22 Claims, 12 Drawing Sheets

COLOR FILTER ARRAY SUBSTRATE, LIQUID CRYSTAL DISPLAY DEVICE COMPRISING THE SAME, AND METHOD FOR MANUFACTURING THE SAME

CROSS REFERENCE TO RELATED APPLICATIONS

This application claims the priority benefit of the Korean Patent Application No. 10-2010-0028349 filed on Mar. 30, 2010, which is hereby incorporated by reference as if fully set forth herein.

BACKGROUND

1. Field of the Invention

The present invention relates to a liquid crystal display (LCD) device, and more particularly, to a color filter array substrate with sensing lines capable of sensing a user's touch, and a method for manufacturing the color filter array substrate.

2. Discussion of the Related Art

A touch screen is a newly-developed input method which substitutes for an input method using mouse or keyboard in a display device. In the touch screen, information may be directly input on a screen by the use of finger or pen. Especially, a user may carry out a desired work while viewing the screen, and furthermore anybody can operate the touch screen with easiness. In this respect, the touch screen is regarded as an optimal input method under the circumstance of GUI (Graphical User Interface).

Recently, the touch screen has been widely applied in various fields, for example, navigation, terminal for industrial use, notebook computer, automatic teller machine (ATM), mobile phone, MP3, PDA, PMP, PSP, mobile game machine, DMB receiver, refrigerator, microwave oven, and washing machine.

Among products using the related art touch screen, an LCD device is designed to use an external-type touch screen, that is, the external-type touch screen should be additionally attached to an upper surface of a complete liquid crystal display panel.

In case of the LCD device using the related art touch screen, a thickness of the liquid crystal display panel is increased due to a thickness of the touch screen, whereby a total thickness of the LCD device is increased.

SUMMARY

Accordingly, the present invention is directed to a color filter array substrate, an LCD device comprising the color filter array substrate, and a method for manufacturing the color filter array substrate that substantially obviates one or more problems due to limitations and disadvantages of the related art.

An aspect of the present invention is to provide a color filter array substrate with sensing lines capable of sensing a user's touch, and a method for manufacturing the color filter array substrate.

Another aspect of the present invention is to provide an LCD device which decreases a thickness of a liquid crystal display panel with a touch screen by the use of color filter array substrate with sensing lines capable of a user's touch.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a color filter array substrate comprising: a plurality of first sensing electrodes at fixed intervals on a substrate; a plurality of second sensing electrodes respectively interposed between each of the first sensing electrodes, wherein each second sensing electrode is provided at a predetermined interval from each first sensing electrode; and a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between.

In another aspect of the present invention, there is provided a liquid crystal display device comprising: a thin film transistor array substrate including a plurality of pixels in respective regions defined by gate and data lines crossing each other; a color filter array substrate; and a liquid crystal layer between the thin film transistor array substrate and the color filter array substrate, wherein the color filter array substrate comprises a plurality of first sensing electrodes at fixed intervals on a substrate; a plurality of second sensing electrodes respectively interposed between each of the first sensing electrodes, wherein each second sensing electrode is provided at a predetermined interval, from each first sensing electrode; and a plurality of conductive black matrixes respectively overlapped with the plurality of first sensing electrodes, wherein the plurality of conductive black matrixes are formed, to electrically connect the neighboring first sensing electrodes provided with the second sensing electrode interposed in-between.

In another aspect of the present invention; there is provided a method for manufacturing a color filter array substrate comprising: forming a plurality of conductive black matrixes at fixed intervals on a substrate; defining a plurality of pixel regions by forming a non-conductive black matrix on an entire surface of the substrate including the plurality of conductive black matrixes; forming a plurality of color filters in respective pixel regions; forming an overcoat layer to cover the plurality of color filters and the non-conductive black matrix; forming a plurality of contact holes by removing a predetermined portion of the overcoat layer and the non-conductive black matrix to expose a predetermined portion of the conductive black matrix; forming a transparent electrode on an entire surface of the overcoat layer including the plurality of contact holes; and forming a plurality of first and second sensing electrodes by selectively removing the transparent electrode, wherein the plurality of first sensing electrodes are formed at fixed intervals, and are electrically connected with the conductive black matrix via the contact hole; and the plurality of second sensing electrodes are respectively interposed between each of the first sensing electrodes, and each second sensing electrode is provided at a predetermined interval from each first sensing electrode.

In another aspect of the present invention, there is provided a method for manufacturing an LCD device comprising: preparing a thin film transistor array substrate including a plurality of pixels in respective regions defined by gate and data lines crossing each other; preparing a color filter array substrate; and forming a liquid crystal layer between the thin film transistor array and the color filter array substrate, wherein the process of preparing the color filter array substrate comprises forming a plurality of conductive black matrixes at fixed intervals on a substrate; defining a plurality of pixel regions by forming a non-conductive black matrix on an entire surface of the substrate including the plurality of conductive black matrixes; forming a plurality of color filters in respective pixel regions; forming an overcoat layer to cover the plurality of color filters and the non-conductive black matrix; forming a plurality of contact holes by removing a predetermined portion of the overcoat layer and the non-conductive black matrix to expose a predetermined portion of the conductive black matrix; forming a transparent electrode on an entire surface of the overcoat layer including the plurality of contact holes; and forming a plurality of first and second sensing electrodes by selectively removing the transparent electrode, wherein the plurality of first sensing electrodes are formed at fixed intervals, and are electrically connected with the conductive black matrix via the contact hole; and the plurality of second sensing electrodes are respectively interposed between each of the first sensing electrodes, and each second sensing electrode is provided at a predetermined interval from each first sensing electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
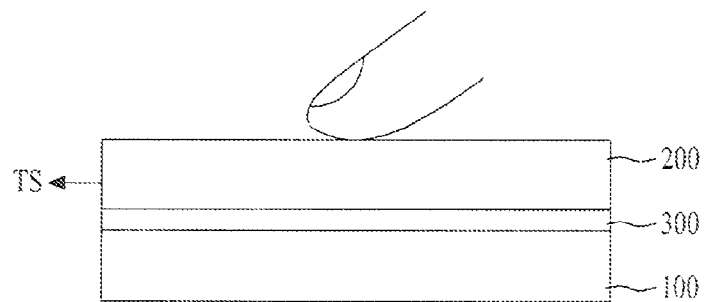
FIG. 1 illustrates an LCD device according to the embodiment of the present invention.

FIG. 1 illustrates an LCD device according to the embodiment of the present invention.

Referring to FIG. 1, the LCD device according to the present invention comprises a thin film transistor array substrate 100, a color filter array substrate, and a liquid crystal layer 300.

The thin film transistor array substrate 100 comprises a plurality of pixels (not shown) for driving the liquid crystal layer 300. Each pixel switches a thin film transistor (not shown) according to a gate signal applied to a gate line, to thereby form an electric field according to a data voltage applied to a data line. By the electric field, the liquid crystal layer 300 is driven. For this, each pixel includes the thin film transistor, and a pixel electrode (not shown) connected with the thin film transistor.

The color filter array substrate 200 comprises a black matrix (not shown) for defining a pixel region corresponding to each of the pixels; red, green, and blue color filters (not shown) in each pixel region defined by the black matrix; an overcoat layer (not shown) for covering the red, green, and blue color filters and black matrix; and a plurality of first and second sensing electrodes (not shown) which are supplied with a common voltage for a driving state of the pixel, and also output a touch signal (TS) corresponding to a user's touch for a non-driving state of the pixel.

The liquid crystal layer 300 is formed between the thin film transistor array substrate 100 and the color filter array substrate 200 facing each other. The liquid crystal layer 300 is driven based on the driving of the pixel, to thereby adjust transmittance of light transmitting via the thin film transistor array substrate 100.

Figure 2:
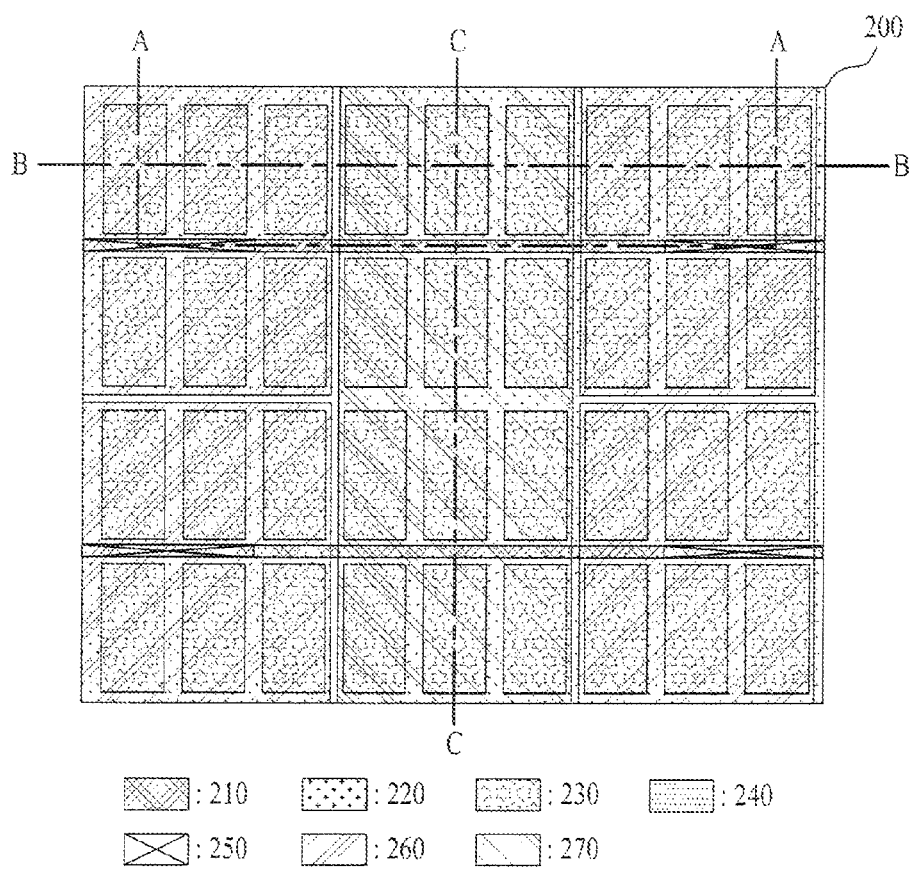
FIG. 2 illustrates a color filter array substrate according to the first embodiment of the present invention.
Figure 3:
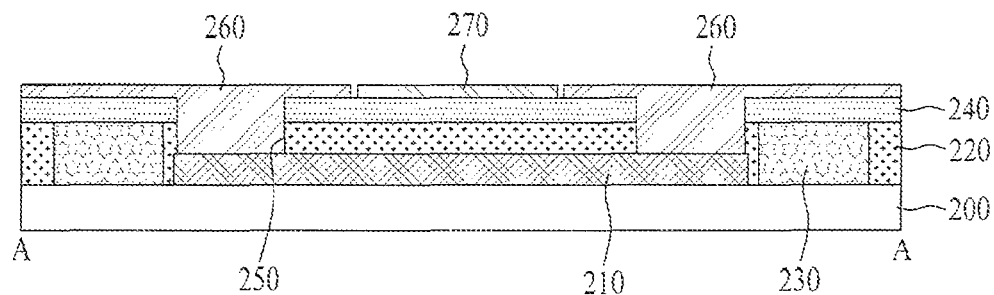
FIG. 3 is a cross section view along A-A of FIG. 2.
Figure 4:
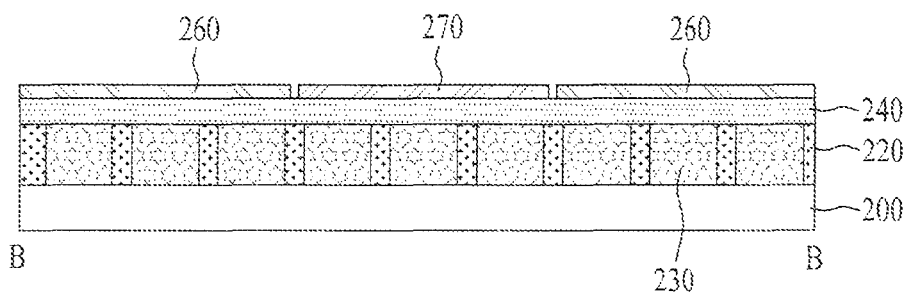
FIG. 4 is a cross section view along B-B of FIG. 2.
Figure 5:
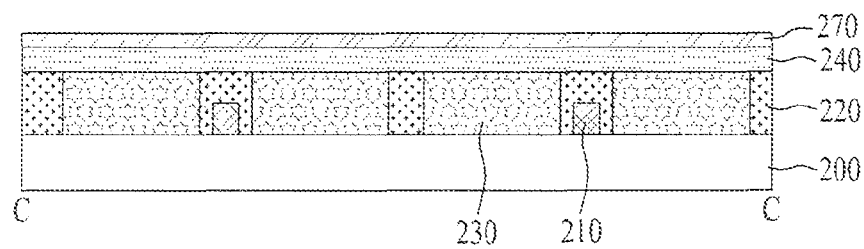
FIG. 5 is a cross section view along C-C of FIG. 2.

FIG. 2 illustrates a color filter array substrate according to the first embodiment of the present invention; FIG. 3 is a cross section view along A-A of FIG. 2; FIG. 4 is a cross section view along B-B of FIG. 2; and FIG. 5 is a cross section view along C-C of FIG. 2.

Referring to FIGS. 2 to 5, the color filter array substrate 200 according to the first embodiment of the present invention comprises a plurality of conductive black matrixes 210, a non-conductive black matrix 220, a plurality of color filters 230, an overcoat, layer 240, a plurality of contact holes 250, and a plurality of first and second sensing electrodes 260 and 270. At this time, the plurality of conductive black matrixes 210, and the plurality of first and second sensing electrodes 260 and 270 constitute a touch screen. The plurality of conductive black matrixes 210 and the plurality of first sensing electrodes 260 may be the X-axis sensing line of the touch screen; and the plurality of second sensing electrodes 270 may be the Y-axis sensing line of the touch screen.

The plurality of conductive black matrixes 210 are formed at fixed intervals, and are simultaneously arranged in parallel to a horizontal direction (or first direction) of the substrate 200. For forming the plurality of conductive black matrixes 210 at fixed intervals in parallel to the horizontal direction, a metal material is firstly formed on an entire surface of the substrate 200, and is then removed selectively.

The plurality of pixel regions may be formed between the neighboring conductive black matrixes 210.

The non-conductive black matrix 220 is formed on the entire surface of the substrate 200 except the plurality of pixel regions, to thereby cover the plurality of conductive black matrixes 210. In this case, the non-conductive black matrix 220 is formed of resin material. The non-conductive black matrix 220 prevents light leakage in the pixel region.

The plurality of color filters 230 are formed in the plurality of pixel regions defined by the non-conductive black matrix 220. For example, the plurality of color filters 230 may be formed of the red, green, and blue color filters arranged repetitively.

The overcoat layer 240 is formed on the entire surface of the substrate 200 to cover the plurality of color filter layers 230 and the non-conductive black matrix 220.

The plurality of contact holes 250 may be formed by removing a predetermined portion of the overcoat layer 240 on the non-conductive black matrix 210, to thereby expose a predetermined portion of the non-conductive black matrix 210. At this time, the plurality of contact holes 250 are formed in the predetermined portion of the first sensing electrodes 260 provided with the second sensing electrode 270 interposed in-between, whereby the first sensing electrodes 260 are electrically connected with the conductive black matrix 210. Thus, the first sensing electrodes 260 provided in the horizontal direction are electrically connected with one another via the non-conductive black matrix 210.

The plurality of first sensing electrodes 260 are formed at fixed intervals along the horizontal and vertical directions (or second direction perpendicular to the first direction), and are formed on the overcoat layer 240 while being, overlapped with the conductive black matrix 210. At this time, each of the first sensing electrodes 260 is electrically connected with the conductive black matrix 210 via the contact hole 250 formed to expose the predetermined portion of the conductive black matrix 210.

Accordingly, the first sensing electrodes 260 provided with the second sensing electrode 270 interposed in-between are electrically connected with, the conductive black matrix 210 via the contact hole 250, whereby the plurality of first sensing electrodes 260 formed along the horizontal direction are electrically connected with the conductive black matrix 210 formed along the horizontal direction.

The plurality of first sensing electrodes 260 may be formed of any one among transparent materials such as ZnO, ZnO:B, ZnO:Al, SnO$_2$, SnO$_2$:F, ITO (Indium Tin Oxide), IZO (Indium Zinc Oxide), ITZO (Indium Tin Zinc Oxide), ZTO (Zinc Tin Oxide), and ATO (Antimony Tin Oxide).

Each of the first sensing electrodes 260 electrically connected with the plurality of conductive black matrixes 210 function as a common electrode to be supplied with a predetermined common voltage for the driving state of the pixel. For the non-driving state of the pixel, each of the first sensing electrodes 260 functions as the X-axis sensing line of the touch screen to be supplied with a sensing input signal to sense the user's touch. In this case, the sensing input signal may be supplied in a pulse type supplied every frame including the driving and non-driving of the pixel, but it is not limited to this type. The sensing input signal may be supplied every two frames.

The plurality of second sensing electrodes 270 may be respectively interposed between each of the first sensing electrodes 260, wherein the plurality of second sensing electrodes 270 may be provided in the vertical direction. The plurality of second sensing electrodes 270 interposed in between each of the first sensing electrodes 260 may be formed as one body. In this case, the plurality of second sensing electrodes 270 are electrically insulated from the conductive black matrix 210 by the non-conductive black matrix 220 and the overcoat layer 240 provided on the conductive black matrix 210.

Each of the second sensing electrodes 270 corresponding to the vertical direction functions as a common electrode to be supplied with a predetermined common voltage together with each of the first sensing electrodes 260 for the driving state of the pixel. For the non-driving state of the pixel, each of the second sensing electrodes 270 functions as the Y-axis sensing line of the touch screen to output the touch signal (TS) corresponding to the user's touch to an externally-provided touch controller (not shown).

Figure 6:
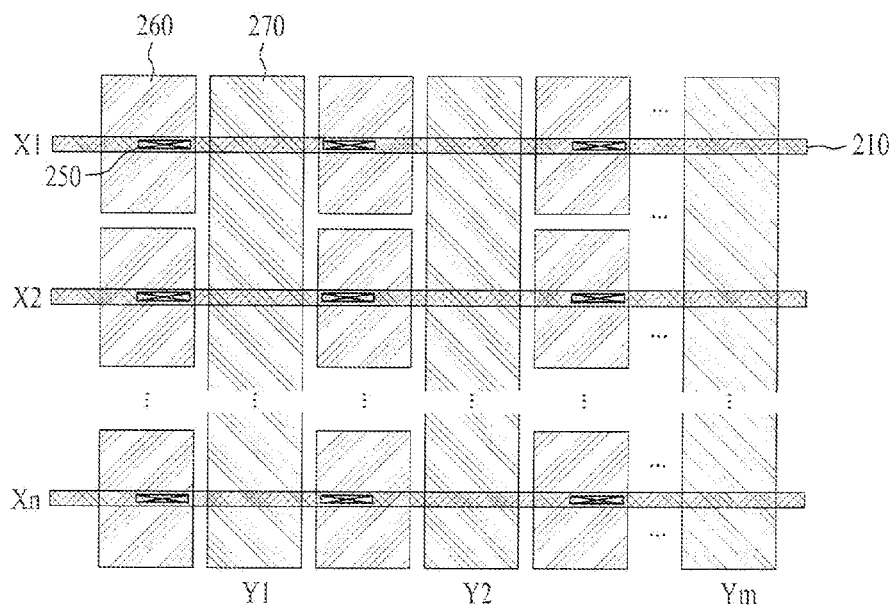
FIG. 6 illustrates an electrode structure of a touch screen shown in FIG. 2.

For the above explanation, the plurality of first sensing electrodes 260 function as the X-axis sensing line of the touch screen; and the plurality of second sensing electrode 270 function as the Y-axis sensing line of the touch screen, but not necessarily. Instead, the plurality of first sensing electrodes 260 may function as the Y-axis sensing line of the touch screen; and the plurality of second sensing electrode 270 may function as the X-axis sensing line of the touch screen As shown in FIG. 6, the color filter array substrate according to the first embodiment of the present invention outputs the touch signal on the basis of capacitance change corresponding to the user's touch through the X-axis sensing lines (X1 to Xn) corresponding to the plurality of first sensing electrodes 260 electrically connected with one another via the conductive black matrix 210, and the Y-axis sensing lines (Y1 to Ym) corresponding to the plurality of second sensing electrodes 270 respectively formed between each of the first sensing electrodes 260.

Figure 7:
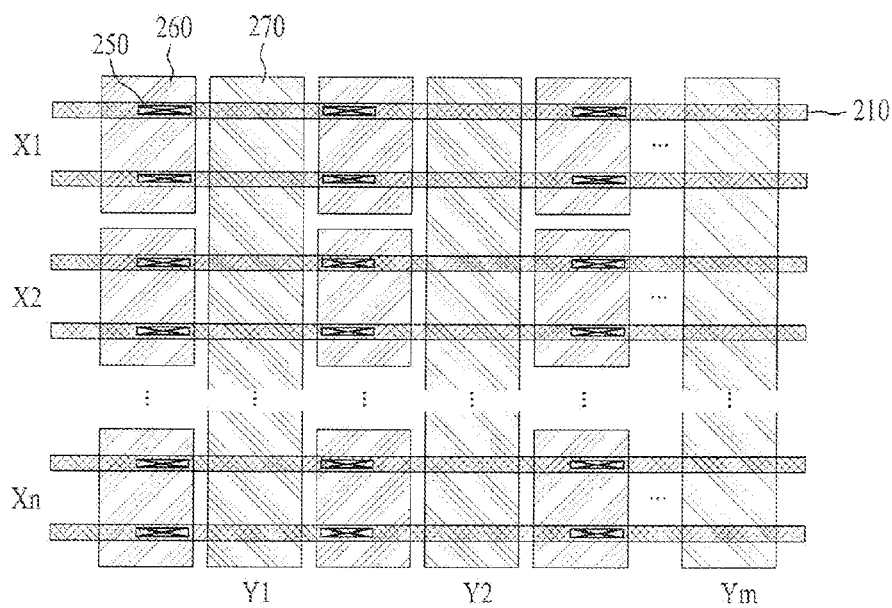
FIG. 7 illustrates an electrode structure of a touch screen shown in FIG. 2.

Meanwhile, as shown in FIG. 7, the color filter array substrate according to the first embodiment of the present invention electrically connects each of the plurality of first sensing electrodes 260 to the two conductive black matrixes 210, to thereby reduce resistance in the plurality of first sensing electrodes 260.

Figure 8:
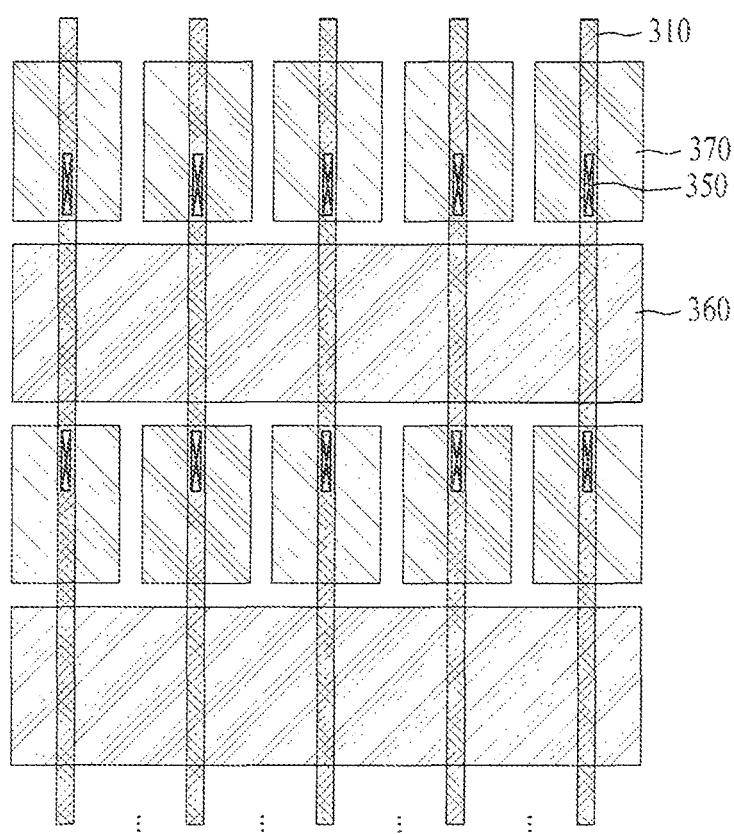
FIG. 8 illustrates a color filter array substrate according to the second embodiment of the present invention, which is a plane view illustrating an electrode structure of a touch screen.

FIG. 8 illustrates a color filter array substrate according to the second embodiment of the present invention, which is a plane view illustrating an electrode structure of a touch screen.

Referring to FIG. 8, the touch screen of the color filter array substrate according to the second embodiment of the present invention includes a plurality of conductive black matrixes 310 formed at fixed intervals along the vertical direction of the substrate (not shown); a plurality of contact holes 350 to expose a predetermined portion of the conductive black matrix 310; a plurality of second sensing electrodes 370 formed at fixed intervals along the horizontal and vertical directions of the substrate, and electrically connected with the conductive black matrix 310 via the contact hole 350; and a plurality of first sensing electrodes 360 respectively interposed between each of the plurality of second sensing electrodes 370 while being in parallel to the horizontal direction of the substrate, wherein the first sensing electrodes 360 interposed between each of the second sensing electrodes 370 are formed as one body.

Except that the plurality of second sensing electrodes 370 are formed at fixed intervals and electrically connected with the conductive black matrix 310 via the contact hole 350; and the plurality of first sensing electrode 360 are respectively interposed between each of the plurality of the first sensing electrodes 360, wherein the first sensing electrodes 360 interposed between each of the second sensing electrodes 370 are formed as one body, the touch screen of the color filter array substrate according to the second embodiment of the present invention is identical in structure to the touch screen shown in FIG. 6.

Thus, the touch screen of the color filter array substrate according to the second embodiment of the present invention enables the same effect as the aforementioned first embodiment a the present invention.

Figure 9:
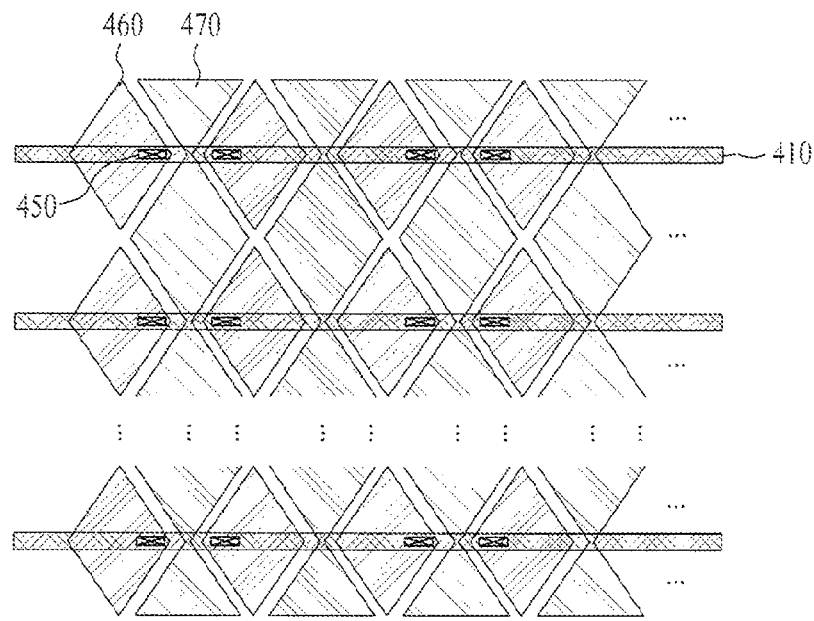
FIG. 9 illustrates a color filter array substrate according to the third embodiment of the present invention, which is a plane view illustrating an electrode structure of a touch screen.

FIG. 9 illustrates a color filter array substrate according to the third embodiment of the present invention, which is a plane view illustrating an electrode structure of a touch screen.

Referring to FIG. 9, the touch screen of the color filter array substrate according to the third embodiment of the present invention is identical in structure to the aforementioned touch screen according to the first embodiment of the present invention except the shape of first and second sensing electrodes 460 and 470.

Each of the plurality of first sensing electrodes 460 is formed in a diamond-like shape, which is electrically connected with a conductive black matrix 410 via a contact hole 450.

Each of the plurality of second sensing electrodes 470 is interposed between of the plurality of first sensing electrodes 460. Herein, each of the plurality of second sensing electrodes 470 is formed in a diamond-like shape, and the plurality of second sensing electrodes 470 are repetitively formed and connected as one body.

The touch screen including the first and second sensing electrodes 460 and 470 senses the user's touch by the use of touch controller. The touch controller differently applies a touch screen driving method based on the shape of first and second sensing electrodes 460 and 470, that is, the square shape shown in FIG. 2 and FIGS. 6 to 8, or the diamond-like shape shown in FIG. 9.

The touch screen of the color filter array substrate according to the third embodiment of the present invention may be controlled by the touch controller adopting the driving method of the first and second sensing electrodes 460 and 470 with the diamond-like shape. Also, the touch screen of the color filter array substrate according to the third embodiment of the present invention may maximize a sensing area, and also minimize a light difference between the sensing electrodes for the driving state of the pixel.

The first and second sensing electrodes 460 and 470 may be formed in various shapes such as regular tetragon, circle, ellipse, triangle, rectangle, and any other shape as well as the diamond-like shape.

Figure 10:
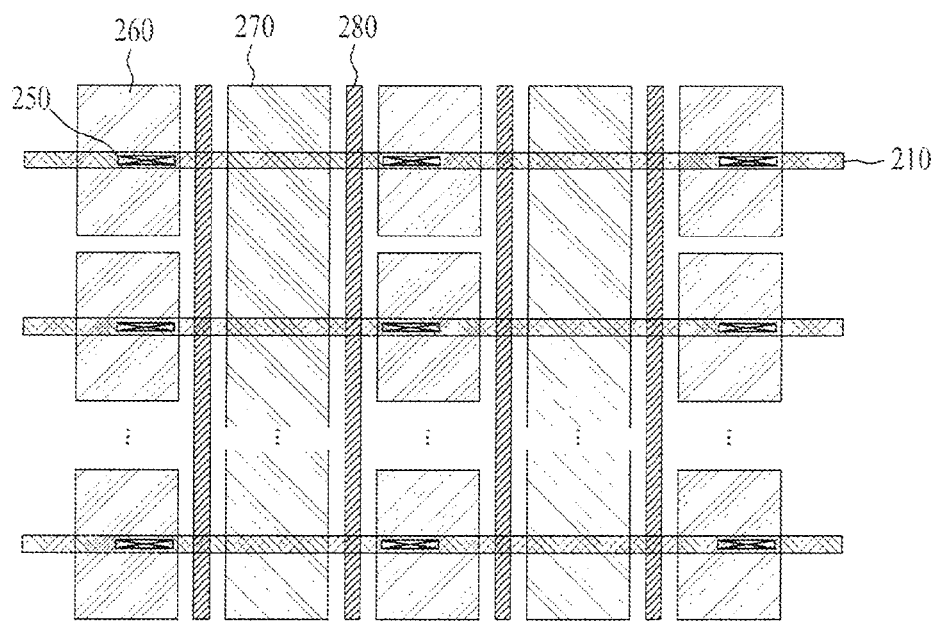
FIG. 10 illustrates a color filter array substrate according to the fourth embodiment of the present invention, which is a plane view illustrating an electrode structure of a touch screen.

FIG. 10 illustrates a color filter array substrate according to the fourth embodiment of the present invention, which is a plane view illustrating an electrode structure of a touch screen.

Referring to FIG. 10, except that a plurality of guard lines 280 are provided with a plurality of second sensing electrodes 270 respectively interposed in-between so as to improve touch sensitivity according to a user's touch, the touch screen of the color filter array substrate according to the fourth embodiment of the present invention is identical in structure to the touch screen according to the first embodiment of the present invention, whereby a detailed explanation for the same parts will be omitted.

Each of the plurality of guard lines 280 is interposed between each of the first and second sensing electrodes 260, wherein each of the plurality of guard lines 280 is supplied with a predetermined reference voltage provided from the external. At this time, the reference voltage may be a ground voltage.

The touch screen of the color filter array substrate according to the fourth embodiment of the present invention improves the touch sensitivity by preventing noise or coupling which might generate between the first and second sensing electrodes for the user's touch.

Meanwhile, the plurality of guard lines 280 may be applied to the second and third embodiments shown in FIGS. 8 and 9.

Figure 11:
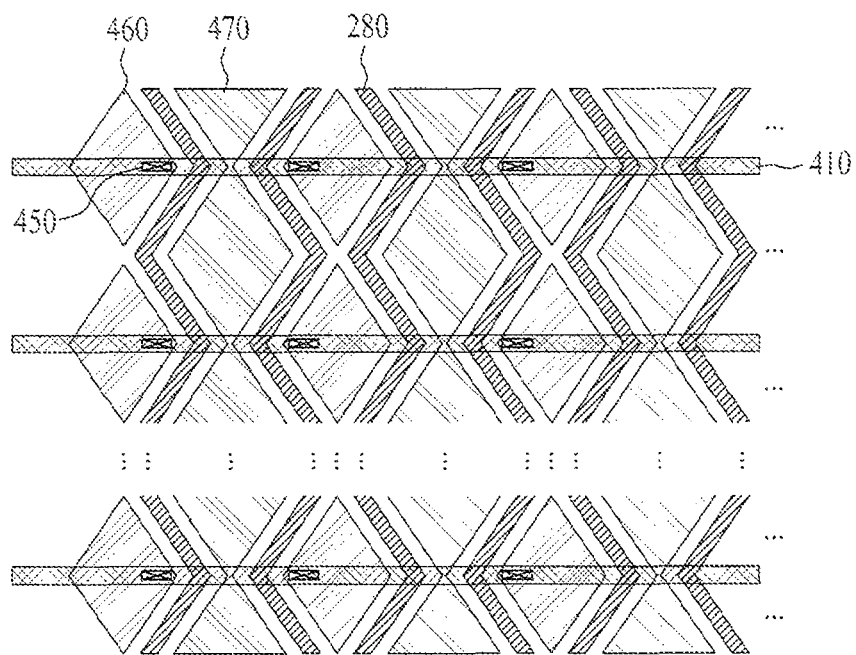
FIG. 11 is a plane view illustrating a modified example of an electrode structure of a touch screen shown in FIG. 10.

For example, the touch screen of the color filter array substrate according to the third embodiment of the present invention, which includes the plurality of guard lines 280, comprises the plurality of first and second sensing electrodes 460 and 470 formed in the diamond-like shape; and the plurality of guard lines 280 respectively formed in the zigzag pattern between the first and second sensing electrodes 460 and 470, as shown in FIG. 11.

In case of an LCD device including the color filter array substrate 200 of the aforementioned embodiment, the touch screen is formed on the color filter array substrate 200, to thereby decrease a total thickness of a liquid crystal display panel.

FIGS. 12A to 12F illustrate a method for manufacturing a color filter array substrate according to the embodiment of the present invention.

Figure 12A:
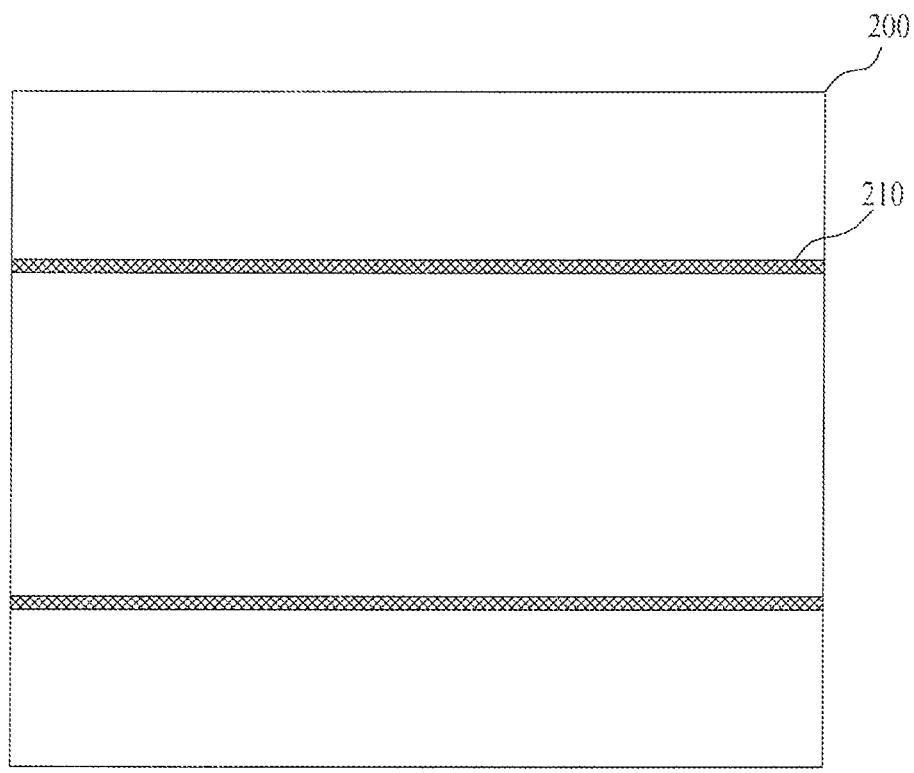
FIGS. 12A to 12F illustrate a method for manufacturing a color filter array substrate according to the embodiment of the present invention.

First, as shown in FIG. 12A, the plurality of conductive black matrixes 210 are formed at fixed intervals on the substrate 200.

Figure 12B:
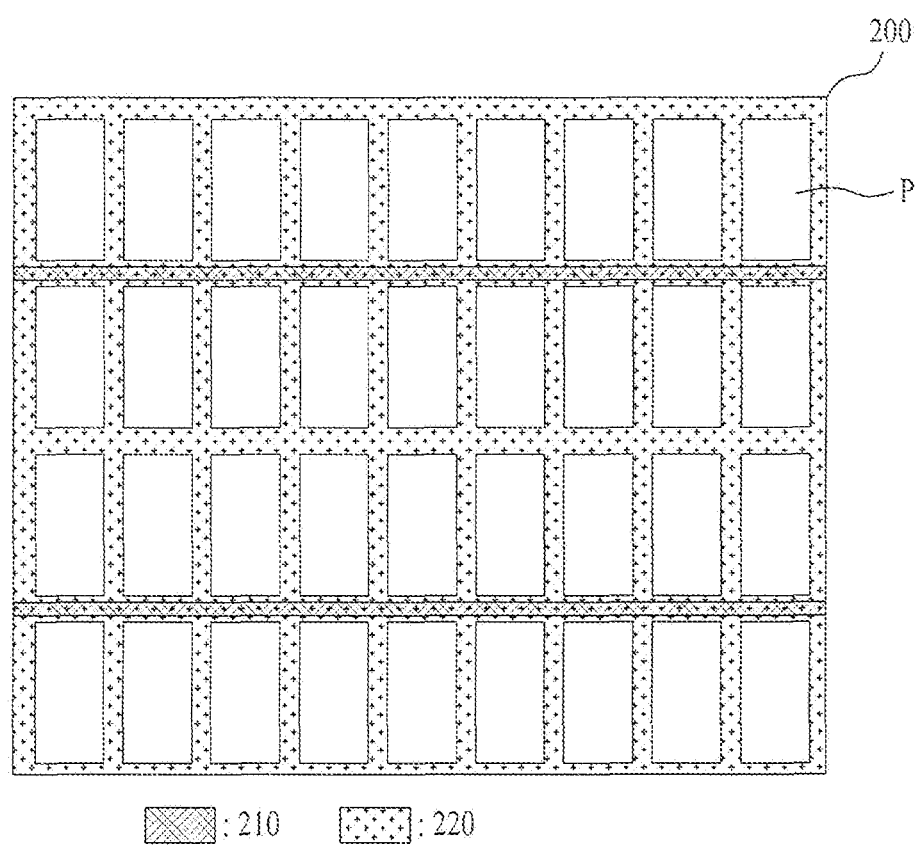

Then, as shown in FIG. 12B, the non-conductive black matrix 220 is formed on the entire surface of the substrate 200 including the conductive black matrixes 210, to thereby define the plurality of pixel regions (P). At this time, the non-conductive black matrixes 220 may be formed of resin material.

Figure 12C:
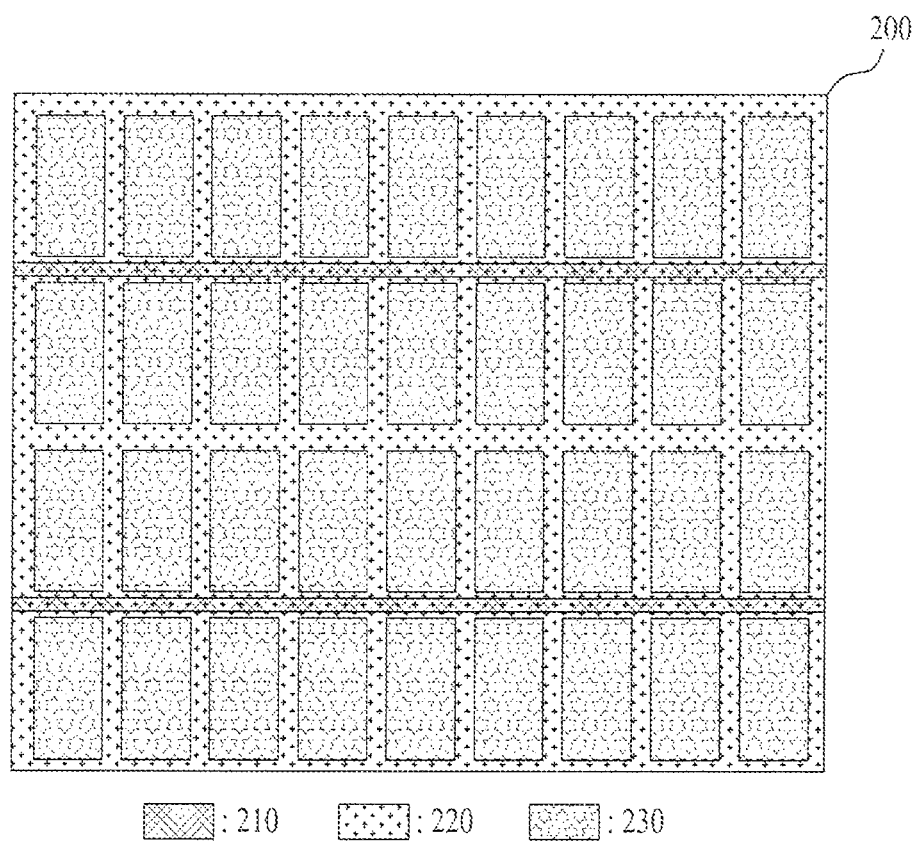

As shown in FIG. 12C, the plurality of color filters 230 are respectively formed in the plurality of pixel regions defined by the non-conductive black matrix 220. In this case, the conductive black matrix 210 is formed among the color filters 230.

Figure 12D:
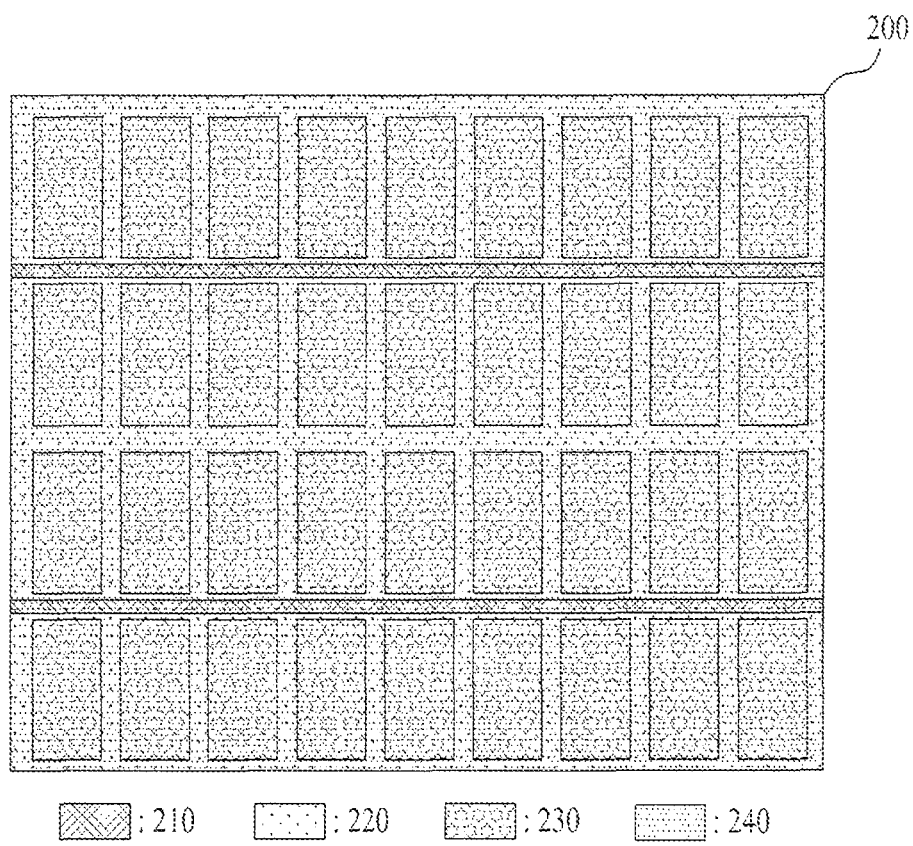

As shown in FIG. 12D, the overcoat layer 240 is formed to cover the plurality of color filters 230 and the non-conductive black matrix 220.

Figure 12E:
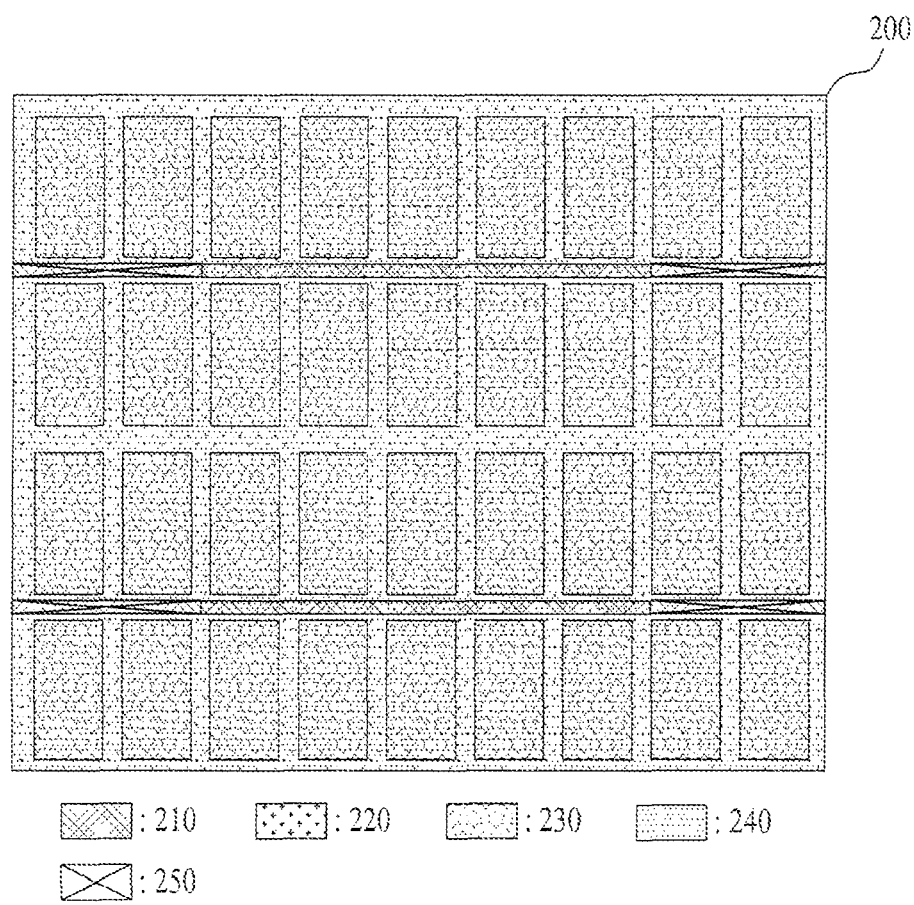

As shown in FIG. 12E, the plurality of contact holes 250 are formed by removing the predetermined portion of the overcoat layer 240 and the non-conductive black matrix 220 to expose the predetermined portion of the conductive black matrix 210.

Then, a transparent electrode is formed on the entire surface of the overcoat layer 240 including the plurality of contact holes 250.

Figure 12F:
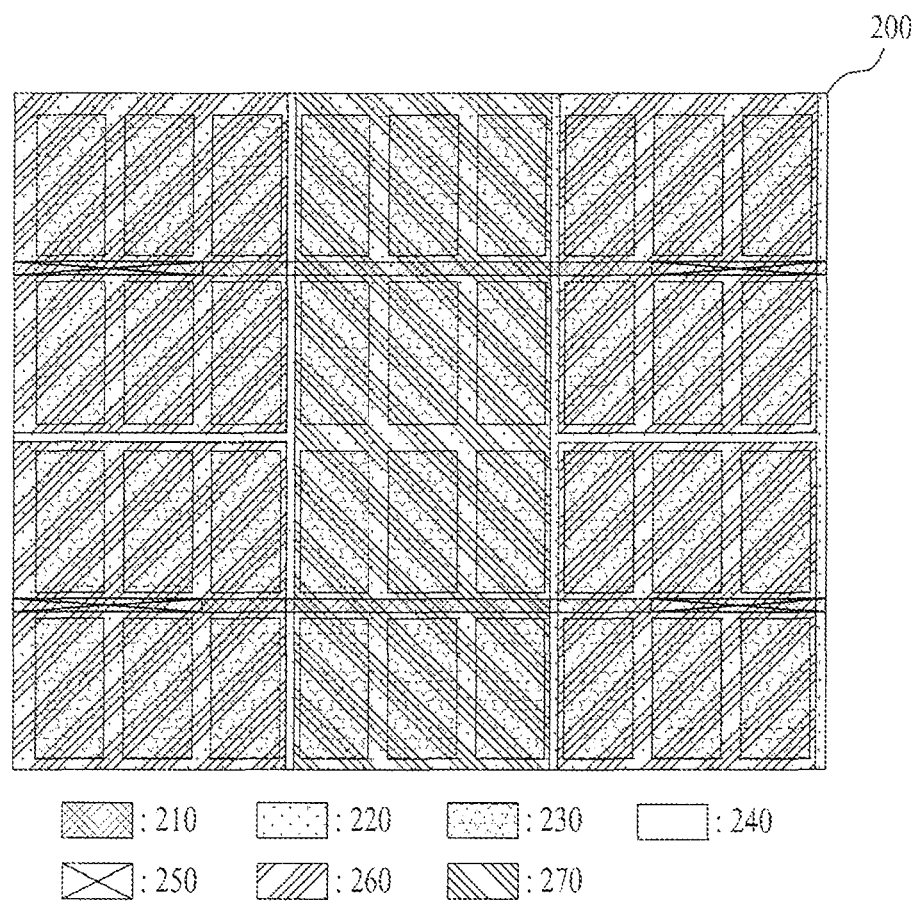

As shown in FIG. 12F, the plurality of first and second sensing electrodes 260 and 270 are simultaneously formed by selectively removing the transparent electrode. The plurality of first sensing electrodes 260 are formed at fixed intervals, and are electrically connected with the conductive black matrix 210 via the contact hole 250. The plurality of second sensing electrodes 270 are respectively interposed between each of the first sensing electrodes 260, wherein each second sensing electrode 270 is provided at a predetermined interval from each first sensing electrode 260. At this time, the plurality of second sensing electrodes 270 are formed in parallel to the plurality of first sensing electrodes 260, wherein the second sensing electrodes 270 interposed between each of the first sensing electrodes 260 are formed as one body. At this time, the first and second sensing electrodes 260 and 270 may be formed in various shapes such as regular tetragon, circle, ellipse, triangle, rectangle, and any other shape as well as the diamond-like shape. Also, the first and second sensing electrodes 260 and 270 may be formed in the different shapes.

The aforementioned method for manufacturing the color filter array substrate, of the present invention may further comprise forming the guard line (not shown, See FIG. 10) between each of the first and second sensing electrodes 260 and 270 by selectively removing the transparent electrode when forming the first and second sensing electrodes 260 and 270. The guard line may be formed in the zigzag pattern between each of the first and second sensing electrodes 260 and 270 according to the shape of the first and second sensing electrodes 260 and 270.

Except that the aforementioned transparent electrode is selectively removed according to the shape of the first and second sensing electrodes, the method for manufacturing the color filter array substrate according to another embodiment of the present invention shown in FIGS. 7 to 11 is identical to the aforementioned manufacturing method.

The method for manufacturing the LCD device according to the embodiment of the present invention enables to reduce the total thickness of the liquid crystal display panel by preparing the thin film transistor array substrate with the plurality of pixels in the respective regions defined by gate and data lines crossing each other; preparing the color filter array substrate obtained by the aforementioned manufacturing method; and forming the liquid crystal layer between the thin film transistor array substrate and the color filter array substrate.

Accordingly, the touch screen is formed on the color filter array substrate, thereby decreasing the total thickness of the liquid crystal display panel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A color filter array substrate comprising:
a plurality of first sensing electrodes at fixed intervals on a substrate;
a plurality of second sensing electrodes respectively interposed between each of the first sensing electrodes, wherein each second sensing electrode is provided at a predetermined interval from each first sensing electrode;
a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between;
a non-conductive black matrix on an entire surface of the substrate to cover the conductive black matrixes, the non-conductive black matrix defining a plurality of pixel regions;
a plurality of color filters in the respective pixel regions;
an overcoat layer covering the plurality of color filters and the non-conductive black matrix, the overcoat layer on the upper surface of the first and second sensing electrodes; and
a contact hole in a predetermined portion of the overcoat layer, the contact hole for electrically connecting the first sensing electrodes with the conductive black matrix.

2. The color filter array substrate according to claim 1, wherein the conductive black matrix is formed between each of the color filters.

3. The color filter array substrate according to claim 1, wherein the non-conductive black matrix is formed of resin material.

4. A color filter array substrate comprising:
a plurality of first sensing electrodes at fixed intervals on a substrate;
a plurality of second sensing electrodes respectively interposed between each of the first sensing electrodes, wherein each second sensing electrode is provided at a predetermined interval from each first sensing electrode; and
a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between,
wherein the plurality of second sensing electrodes are formed as one body while being in parallel to the plurality of first sensing electrodes.

5. A color filter array substrate comprising:
a plurality of first sensing electrodes at fixed intervals on a substrate;
a plurality of second sensing electrodes respectively interposed between each of the first sensing electrodes, wherein each second sensing electrode is provided at a predetermined interval from each first sensing electrode;
a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between; and
a plurality of guard lines respectively interposed between each of the first and second sensing electrodes.

6. A liquid crystal display device comprising:
a thin film transistor array substrate including a plurality of pixels in respective regions defined by gate and data lines crossing each other;
a color filter array substrate; and
a liquid crystal layer between the thin film transistor array substrate and the color filter array substrate,
wherein the color filter array substrate comprises:
a plurality of first sensing electrodes at fixed intervals on a substrate;
a plurality of second sensing electrodes respectively interposed between each of the first sensing electrodes, wherein each second sensing electrode is provided at a predetermined interval from each first sensing electrode;
a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between;
a non-conductive black matrix on an entire surface of the substrate to cover the conductive black matrixes, the non-conductive black matrix defining a plurality of pixel regions;
a plurality of color filters in the respective pixel regions;
an overcoat layer covering the plurality of color filters and the non-conductive black matrix, the overcoat layer on the upper surface of the first and second sensing electrodes; and
a contact hole in a predetermined portion of the overcoat layer, the contact hole for electrically connecting the first sensing electrodes with the conductive black matrix.

7. The liquid crystal display device according to claim 6, wherein the conductive black matrix is formed between each of the color filters.

8. The liquid crystal display device according to claim 6, wherein the non-conductive black matrix is formed of resin material.

9. A liquid crystal display device comprising:
a thin film transistor array substrate including a plurality of pixels in respective regions defined by gate and data lines crossing each other;
a color filter array substrate; and
a liquid crystal layer between the thin film transistor array substrate and the color filter array substrate,
wherein the color filter array substrate comprises:
a plurality of first sensing electrodes at fixed intervals on a substrate;
a plurality of second sensing electrodes respectively interposed between each of the first sensing electrodes, wherein each second sensing electrode is provided at a predetermined interval from each first sensing electrode; and
a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between,
wherein the plurality of second sensing electrodes are formed as one body while being in parallel to the plurality of first sensing electrodes.

10. The liquid crystal display device according to claim 9, wherein the color filter array substrate further comprising:
a non-conductive black matrix on an entire surface of the substrate to cover the conductive black matrixes, the non-conductive black matrix defining a plurality of pixel regions;
a plurality of color filters in the respective pixel regions;
an overcoat layer covering the plurality of color filters and the non-conductive black matrix, the overcoat layer on the upper surface of the first and second sensing electrodes; and
a contact hole in a predetermined portion of the overcoat layer, the contact hole for electrically connecting the first sensing electrodes with the conductive black matrix.

11. The liquid crystal display device according to claim 10, wherein the conductive black matrix is formed between each of the color filters.

12. A liquid crystal display device comprising:
a thin film transistor array substrate including a plurality of pixels in respective regions defined by gate and data lines crossing each other;
a color filter array substrate; and
a liquid crystal layer between the thin film transistor array substrate and the color filter array substrate,
wherein the color filter array substrate comprises:
a plurality of first sensing electrodes at fixed intervals on a substrate;
a plurality of second sensing electrodes respectively interposed between each of the first sensing electrodes, wherein each second sensing electrode is provided at a predetermined interval from each first sensing electrode; and
a plurality of conductive black matrixes respectively overlapped with the plurality of first sensing electrodes, wherein the plurality of conductive black matrixes are formed to electrically connect the neighboring first sensing electrodes provided with the second sensing electrode interposed in-between,
wherein the color filter array substrate further comprise a plurality of guard lines respectively interposed between each of the first and second sensing electrodes.

13. The liquid crystal display device according to claim 10, wherein the color filter array substrate further comprising:
a non-conductive black matrix on an entire surface of the substrate to cover the conductive black matrixes, the non-conductive black matrix defining a plurality of pixel regions;
a plurality of color filters in the respective pixel regions;
an overcoat layer covering the plurality of color filters and the non-conductive black matrix, the overcoat layer on the upper surface of the first and second sensing electrodes; and
a contact hole in a predetermined portion of the overcoat layer, the contact hole for electrically connecting the first sensing electrodes with the conductive black matrix.

14. The liquid crystal display device according to claim 13, wherein the conductive black matrix is formed between each of the color filters.

15. A method for manufacturing a color filter array substrate comprising:
forming a plurality of conductive black matrixes at fixed intervals on a substrate;
defining a plurality of pixel regions by forming a non-conductive black matrix on an entire surface of the substrate including the plurality of conductive black matrixes;
forming a plurality of color filters in respective pixel regions;
forming an overcoat layer to cover the plurality of color filters and the non-conductive black matrix;
forming a plurality of contact holes by removing a predetermined portion of the overcoat layer and the non-conductive black matrix to expose a predetermined portion of the conductive black matrix;
forming a transparent electrode on an entire surface of the overcoat layer including the plurality of contact holes; and
forming a plurality of first and second sensing electrodes by selectively removing the transparent electrode, wherein the plurality of first sensing electrodes are formed at fixed intervals, and are electrically connected with the conductive black matrix via the contact hole; and the plurality of second sensing electrodes are respectively interposed between each of the first sensing electrodes, and each second sensing electrode is provided at a predetermined interval from each first sensing electrode.

16. The method according to claim 15, further comprising forming a plurality of guard lines between each of the first and second sensing electrodes by selectively removing the transparent electrode when forming the first and second electrodes.

17. The method according to claim 15, wherein the conductive black matrix is formed between each of the color filters.

18. The method according to claim 15, wherein the plurality of second sensing electrodes are formed as one body while being in parallel to the plurality of first sensing electrodes.

19. A method for manufacturing an LCD device comprising:
preparing a thin film transistor array substrate including a plurality of pixels in respective regions defined by gate and data lines crossing each other;
preparing a color filter array substrate; and
forming a liquid crystal layer between the thin film transistor array and the color filter array substrate, wherein the process of preparing the color filter array substrate comprises:

forming a plurality of conductive black matrixes at fixed intervals on a substrate;

defining a plurality of pixel regions by forming a non-conductive black matrix on an entire surface of the substrate including the plurality of conductive black matrixes;

forming a plurality of color filters in respective pixel regions;

forming an overcoat layer to cover the plurality of color filters and the non-conductive black matrix;

forming a plurality of contact holes by removing a predetermined portion of the overcoat layer and the non-conductive black matrix to expose a predetermined portion of the conductive black matrix;

forming a transparent electrode on an entire surface of the overcoat layer including the plurality of contact holes; and forming a plurality of first and second sensing electrodes by selectively removing the transparent electrode, wherein the plurality of first sensing electrodes are formed at fixed intervals, and are electrically connected with the conductive black matrix via the contact hole; and the plurality of second sensing electrodes are respectively interposed between each of the first sensing electrodes, and each second sensing electrode is provided at a predetermined interval from each first sensing electrode.

20. The method according to claim 19, wherein the process of preparing the color filter array substrate further comprise forming a plurality of guard lines between each of the first and second sensing electrodes by selectively removing the transparent electrode when forming the first and second electrodes.

21. The method according to claim 19, wherein the conductive black matrix is formed between each of the color filters.

22. The method according to claim 19, wherein the plurality of second sensing electrodes are formed as one body while being in parallel to the plurality of first sensing electrodes.

* * * * *